United States Patent Office 3,232,900
Patented Feb. 1, 1966

3,232,900
THERMAL AND PIGMENT STABLE LATICES OF OXIDIZED LIQUID DIOLEFIN POLYMERS WITH SULFATE EMULSIFIERS
Neville Leverne Cull, Baker, and Edgar Warren Seefield, Baton Rouge, La., and Walter L. Van Nostrand, Jr., Staten Island, N.Y., assignors to Esso Research and Engineering Company, a corporation of Delaware
No Drawing. Filed Nov. 20, 1961, Ser. No. 153,699
5 Claims. (Cl. 260—29.7)

This invention relates to the preparation of latices from liquid diolefin polymers. More particularly, it relates to the preparation of emulsions from such liquid polymers which have been oxidized with air or oxygen.

Liquid polymers, suitable for use as coating compositions which dry to a hard, tack-free film, can be prepared by various methods from conjugated diolefins alone or together with materials copolymerizable therewith. Alkali metal polymerization, emulsion polymerization, as well as bulk or mass polymerization in the presence of a diluent and a peroxide-type catalyst have been used for this purpose with varying degrees of success. In general, the sodium-catalyzed polymers of butadiene or copolymers of butadiene with styrene have been found most economical to produce and to have a good drying rate.

In recent years, there has been a trend toward water-based coatings as opposed to solvent-based coatings because the water-based coatings present less of a fire hazard, are less toxic and have little, if any, objectionable odor. While such water-based coatings can be prepared from sodium or other alkali metal catalyzed polymers mentioned above, they possess an inherent disadvantage in that their use is limited to thin films of 1.2 mils or less. Thicker films, particularly those of three mils or thicker exhibit very poor curing characteristics.

The disadvantage of thick film curing can be overcome by oxidizing the liquid diolefin polymers by blowing with air or oxygen or other oxygen-containing gas in the presence of a solvent, preferably an aromatic hydrocarbon, and preferably with a catalyst, such as a small amount of a metal naphthenate or other drier. These oxidized polymers contain up to about 20% oxygen and have much improved drying characteristics, particularly when applied in films thicker than 1.2 mils. These oxygen-modified polymers, therefore, afford very attractive advantages as starting materials for the formation of water-based coatings.

It has now been found that stable emulsions having high pigment compatibility, containing very little solvent and having low particle size can be prepared by emulsifying hydrocarbon solutions of air blown liquid diolefin polymers with a fatty alcohol sulfate emulsifier, and removing the solvent.

Liquid polymers to which this invention is directed are prepared in the presence of an alkali metal catalyst from diolefins having 4 to 6 carbon atoms per molecule, such as butadiene, isoprene, dimethyl butadiene, propylene and methyl pentadiene. These diolefins may be copolymerized with minor amounts of ethylenically unsaturated monomers, such as styrene, acrylonitrile, methyl vinyl ketone or with styrene having alkyl group substituted on the ring; e.g., paramethyl styrene, dimethyl styrene, etc.

A preferred diolefin polymer is one prepared by reacting 75 to 100 parts of butadiene and 25 to 0.5 to 0 part of styrene in the presence of metallic sodium catalyst. Polymerization is carried out in a reaction diluent at temperatures from about 25° C. to 105° C. with about 0.1 to 10 parts of finely divided sodium per 100 parts of monomers used. The diluent used in the polymerization boils between about —15° C. and 200° C. in amounts varying from 100 to 500 parts per 100 parts of monomers. Preferred diluents are aliphatic hydrocarbons such as solvent naphtha or straight-run mineral spirits, such as Varsol. In order to obtain a water white product, a co-diluent, about 10 to 45 parts per 100 parts of monomers, may also be used. This codiluent consists of a $C_4$ to $C_8$ aliphatic ether such as dioxane-1,4 or diethyl ether. It is also beneficial to use about 5 to 35 wt. percent (based on sodium) of an alcohol such as methanol, ethanol, normal and isopropanol, primary, secondary and isobutanol or normal or isopentanol to overcome the initial induction period. The resulting product may vary in viscosity from 0.15 to 20 poises, measured at 50% N.V.M. The preparation of this polymer is described in detail in U.S. Patent No. 2,849,510, issued August 26, 1958, to Stanley E. Jaros et al., the subject matter of which is incorporated herein by reference.

The above polymer is modified for the purposes of this invention by blowing with air or oxygen or other oxygen-containing gas in the presence of a highly aromatic hydrocarbon solvent having a kauri-butanol value of at least 40. Suitable solvents include benzene, toluene, hemi-mellitene, the xylenes, Solvesso 100 (a mixture of aromatic hydrocarbons boiling from about 150 to 175° C.), Solvesso 150 (a mixture of aromatic hydrocarbons boiling from about 190 to 210° C.) or mixtures thereof and the like. However, solvents boiling below the boiling point of water are preferred when latices are to be prepared from the oxidized polymer in order to facilitate the removal of the solvent from the aqueous latex. Catalysts suitable for the oxidation include organic salts of metals such as the naphthenates, octoates, and other hydrocarbon soluble metal salts of cobalt, lead, iron or manganese. These catalysts are used in amounts ranging from 0.001% to 1.0%. The process can be carried out in an open kettle, a packed tower or the like. The percent of oxygen in the product will vary according to the conditions of time and temperature from a trace to 20% or more.

The choice of emulsifier for use in preparing commercially acceptable latices from the above oxidized polymers has been found to depend upon several factors. First is the stability of the emulsion as originally prepared. Secondly is the stability of the emulsion to the time and temperature necessary to remove the solvent from the latex, particularly that necessary to reduce the solvent to less than 1%. Thirdly is the compatibility of the latex with pigment dispersions.

In accordance with this invention, it has been found that only a very small class of emulsifiers fulfill all of the above requirements. This class of emulsifiers has been found to be the fatty alcohol sulfates having the formula $MRSO_4$ where M is sodium, potassium, ammonium, triethanolamine or diethanolamine and R is lauryl, oleyl, cetyl or their ethoxylated derivatives.

For many applications it is ofen desirable to prepare latices having very small particle size; i.e., below 0.5 micron. To accomplish this it has ben found that several factors are critical. In the first place the emulsifier must be very hydrophobic. Within the class described above sodium cetyl sulfate has been found to be extremely effective in preparing latices having low particle size. It is also necessary to provide a ratio of hydrocarbon to water of about 70 parts hydrocarbon to 30 parts of water. The term hydrocarbon is intended to include both solvent and polymer. Finally the concentration of the emulsifier is important. Not over five parts, preferably 3 to 5 parts should be used, when very small particle sizes are desired. Otherwise the emulsifier may be as low as 2. In addition to the above, the concentration of the polymer solution in hydrocarbon also plays a part in determining particle size, the more dilute the cement the smaller the particle size.

Accordingly, therefore, it is another feature of this invention to prepare latices of minimum particle size by emulsifying about seventy parts by volume of a hydrocarbon solution of the oxidized polymer with about 30 parts of water in the presence of about 2 to 5 parts by weight based on polymer of sodium cetyl sulfate as the emulsifier.

It is also a further feature of this invention to control the pigment compatibility of the latices by controlling the pH of the latex. It has been found that the pH of the latex from which solvent has been stripped should be adjusted to above 8 by the addition of an alkali, such as ammonia, in order to prepare stable blends with pigment dispersions.

In the practice of the invention a solution of oxidized polymer in an aromatic hydrocarbon, e.g., benzene, is emulsified in water containing the emulsifier. The amount of emulsifier may vary from 2 to 5 phr. or more. When the final latex is used as a coating the emulsifier content should be as low as possible in order to increase the water resistance. The polymer solution is added slowly to the water-emulsifier blend with vigorous agitation of the mixture for 10–60 minutes, preferably 30–60 minutes. The hydrocarbon is then distilled from the latex under vacuum so that the final latex contains less than 1% of solvent. The pH of the final latex is then adjusted to above 8 by the addition of dilute aqueous ammonia.

The latices produced by this procedure contain about 40 to 60% by weight total solids. A typical sample has the following properties:

N.V.M. _____ 54.1
Emulsifier (phr.) [1] _____ 5.0
Brookfield visc. (cps.) _____ 110.0
pH _____ 3.3
Residual solvent (wt. percent) ____ 0.7
Stability _____ Does not separate in 6 weeks.

[1] Parts per hundred parts by weight of polymer.

The advantages of this invention will be better understood from a consideration of the following experimental data which are given for the sake of illustration, but without intention of limiting the invention thereto.

EXAMPLE 1

A butadiene-styrene polymer oil was prepared from the following charge.

Butadiene-1,3 _____parts by weight__ 80
Styrene _____do____ 20
Mineral spirits _____do____ 200
Dioxane _____do____ 40
Isopropanol _____do____ 0.2
Sodium (10 to 50 microns) _____do____ 1.5
Temperature _____° C__ 50

The product resulting from the above polymerization had a viscosity of 1.5 poises at 50% N.V.M. and the non-volatile portion thereof had an average molecular weight of about 3000.

The polymer thus obtained was dissolved in benzene to make a 35% N.V.M. solution. It was then blown with air at about 230° F. until the oxygen content reached about 10% (based on polymer). Solvent was then removed until the N.V.M. reached about 50%. Emulsions were prepared from this solution employing about 30 commercially available emulsifiers both anionic and nonionic by slowly adding the polymer solution to equal quantities of water containing the emulsifier while agitating for 10 to 30 minutes in a Premier Dispersator. Many surfactants produced relatively stable emulsions, some would not emulsify the polymer and others exhibited poor stability.

Those surfactants which were successful in emulsifying the polymer were then tested for heat stability during stripping by heating the latices for 30 to 60 minutes at 140° F. The following data were obtained:

Table I

| | Emulsifier | Stability | |
|---|---|---|---|
| | | 30 Min. at 140° F. | 60 Min. at 140° F. |
| 1 | Nonyl phenyl ether of ethylene glycol. | Inverted-Separated. | |
| 2 | Condensation product of ethylene oxide and castor oil. | _____do_____ | |
| 3 | Iso-octyl phenoxypolyethoxy ethanol (8 to 10 ethylene oxide units). | _____do_____ | |
| 4 | Nonyl phenoxy polyethoxy ethanol (4 ethylene oxide units). | _____do_____ | |
| 5 | Sodium lauryl sulfate. | Stable_____ | Stable. |
| 6 | Ammonium lauryl sulfate. | _____do_____ | Do. |
| 7 | Triethanolamine lauryl sulfate. | _____do_____ | Do. |
| 8 | Sodium ethoxylated lauryl sulfate. | _____do_____ | Do. |
| 9 | Sodium cetyl sulfate. | _____do_____ | Do. |
| 10 | Sodium tridecyl sulfate. | Coagulated_ | |
| 11 | Sodium oleyl sulfate. | Stable_____ | Do. |
| 12 | Sodium oxyethylene nonylphenol sulfate. | _____do_____ | Do. |
| 13 | Sodium dioctyl sulfosuccinate. | _____do_____ | Do. |

Of the above emulsifiers the only ones which produced emulsions stable during the stripping operation at 140° F. were the fatty alcohol sulfates, sodium oxyethylene nonylphenol sulfate and sodium dioctylsulfosuccinate. The latices obtained with these last named emulsifiers were then tested for compatibility with the following pigment dispersions.

Pigment A—33 vol. percent $TiO_2$, 66.0% talc and 1% carbon black and stabilized with hydroxyethylcellulose
Pigment B—Same, no thickener
Pigment C—$TiO_2$ alone The following results were obtained.

Table II

| Emulsifier | PVC* | Pigment | | | pH |
|---|---|---|---|---|---|
| | | A | B | C | |
| Sodium lauryl sulfate | 40 | Uniform-Stable | Same | Same | 3.3 |
| Do | 30 | ___do___ | ___do___ | ___do___ | 8.2 |
| Ammonium lauryl sulfate | 40 | Stable | | | 9.0 |
| Triethanol amine lauryl sulfate | 40 | ___do___ | | | 9.0 |
| Sodium ethoxylated lauryl sulfate | 40 | ___do___ | | | 9.0 |
| Sodium oleyl sulfate | 40 | ___do___ | | | 9.0 |
| Sodium dioctyl sulfosuccinate | 30 | Coagulated | Same | | 3.35 |
| Sodium oxyethylene-nonylphenol sulfate | | Very poor | | | 2.85 |

*Pigment volume concentration.

The data in Table II show that only the fatty alcohol sulfates form emulsions which are compatible with pigments and thus are the only emulsifiers which satisfy all the requirements necessary to prepare a commercially acceptable latex.

EXAMPLE 2

The oxidized polymer of Example 1 was emulsified with an equal amount of water containing 2 parts by weight of emulsifier per 100 parts by weight of polymer. The solvent was removed and the latex (48% N.V.M.) was pigmented with a mixture of about 33 vol. % $TiO_2$, 66.0% talc and 1.0% carbon black and films were prepared and baked at 350° F. for 30 min. with the following results.

*Table III*

| | Na lauryl Sulfate | Sodium oleyl Sulfate | Potassium Lauryl Sulfate |
|---|---|---|---|
| Emulsifier | | | |
| $H_2O$ resistance, days | 11+ | 18 | 1. |
| Reverse Impact, in./lbs | 30 | 20 | 20. |

The data in Table III show that excellent films can be formed with the latices of this invention. These films have good water resistance and impact strength.

EXAMPLE 3

The oxidized polymer of Example 1 was diluted to 25% N.V.M. with benzene and emulsified for 1 hour in a one-inch Dispersator using various fatty alcohol emulsifiers at different hydrocarbon/water ratios. The following data were obtained.

*Table IV*

| | Emulsifier | | | | | | | |
|---|---|---|---|---|---|---|---|---|
| | A | B | C | D | E | F | G | H |
| Raw Latex: | | | | | | | | |
| N.V.M., Wt. Percent | 11.8 | 17.1 | 17.5 | 12.4 | 12.9 | 14.1 | 15.8 | 15.6 |
| pH | 2.9 | 3.0 | 6.9 | 2.9 | 2.9 | 3.4 | 5.2 | 3.4 |
| Brookfield visc. (cps.) | 150 | 1,230 | 110 | 0.0 | 0.0 | 700 | 0.0 | 0.0 |
| Particle Size (microns) | 0.29 | 0.27 | | | | | | |
| Stripped Latex: | | | | | | | | |
| NVM | 49.4 | 49.4 | (1) | 50.9 | 45.5 | 49.5 | 45.9 | 52.4 |
| pH | 2.8 | 3.0 | | 3.1 | 3.0 | | 3.2 | 3.3 |
| Brookfield visc. (cps.) | 375 | 150 | | | | >10,000 | 20 | 100 |
| Particle Size (microns) | 0.55 | 0.205 | | 0.23 | 0.34 | | | |
| Pigment Compatibility After Adjusting pH to above 8.0 with $NH_4OH$ | Good | Good | | Good | Good | | Good | Good |
| Reverse Impact | | | | 50 | 30 | | | |

[1] Coagulated on stripping.

Emulsifiers and hydrocarbon/water ratios used in above table:

A—Sodium cetyl sulfate, 5 parts per 100 parts polymer (phr.), hydrocarbon/water ratio 50/50
B—Sodium cetyl sulfate (5 phr.), hydrocarbon/water ratio 70/30
C—Triethanol amine lauryl sulfate (5 phr.), hydrocarbon/water ratio 70/30
D—Sodium oleyl sulfate (2 phr.), hydrocarbon/water ratio 50/50
E—Ammonium lauryl sulfate (5 phr.), hydrocarbon/water ratio 50/50
F—Mixture of sodium lauryl sulfate (1.5 phr.) and iso-octyl phenoxy polyethoxy ethanol containing 8 to 10 ethylene oxide units (2.5 phr.), hydrocarbon/water ratio 47/53. About 1% of polyvinyl alcohol was added to the emulsion as a stabilizer
G—Sodium lauryl sulfate (2 phr.), hydrocarbon/$H_2O$ ratio 47/53
H—Potassium lauryl sulfate (2 phr.), hydrocarbon/$H_2O$ ratio 47/53

The above data are indicative of the fact that various fatty alcohol sulfates will form latices which are thermally stable and are compatible with pigments. However, mixtures of sodium lauryl sulfate and iso-octyl phenoxy polyethoxy ethanol do not form emulsions which are stable to stripping under the conditions described.

EXAMPLE 4

Emulsions were prepared as described in Example 1 except that the hydrophobic character of the emulsifier, the hydrocarbon/water ratio and the emulsifier concentration were varied to determine their effect upon the particle size. In the first test the effect of the hydrophobic character of the emulsifier was determined with the following results.

*Table V*

| Emulsifier | Na Lauryl $SO_4$ | Na Cetyl $SO_4$ |
|---|---|---|
| Emulsifier conc., phr | 5 | 5 |
| Hydrophobic Character | Least | Most |
| $HC/H_2O$ Ratio, Volume percent | 70/30 | |
| Particle Size (microns) | .28 | .17 |

These data show that the particle size decreases with the increasing hydrophobic character of the emulsifier.

In Table VI is shown the effect of hydrocarbon/water volume ratio on the particle size of the most hydrophobic emulsifier sodium cetyl sulfate.

*Table VI*

| Emulsifier | Na Cetyl $SO_4$ | Na Cetyl $SO_4$ |
|---|---|---|
| Emulsifier conc., phr | 5 | 5 |
| $HC/H_2O$ Ratio, volume percent | 50/50 | 70/30 |
| Particle Size (microns) | .29 | .172 |

The data in Table VI show that decreasing the ratio of hydrocarbon to water in the emulsion increases the particle size.

Table VII shows the relation of emulsifier concentration to particle size at a constant hydrocarbon/water ratio of 70/30.

*Table VII*

| Emulsifier | Na Lauryl $SO_4$ | | | Na Cetyl $SO_4$ |
|---|---|---|---|---|
| Emulsifier conc., phr | 5 | 3 | 2 | 5 |
| $HC/H_2O$ Ratio, volume percent | | | 70/30 | |
| Particle Size (microns) | .28 | .22 | .41 | .172 |

The data in Tables V, VI and VII show that latices having very small particle sizes are obtained by choosing a very hydrophobic emulsifier such as sodium cetyl sulfate, maintaining the hydrocarbon/water concentration at at least 70/30 and employing from 3 to 5 phr. of emulsifier.

EXAMPLE 5

Emulsions were prepared as in Example 1 using sodium lauryl sulfate, sodium dioctyl succinate and sodium oxyethylene nonyl phenol sulfate as emulsifiers. The solvent was removed and the resulting latex was blended with pigment A of Example 1 before and after adjusting the pH with ammonia. The following data were obtained:

*Table VIII*

| Emulsifier | Emulsifier conc. phr. | pH | Pigment Compatibility |
|---|---|---|---|
| Na lauryl SO$_4$ | 5 | 3.3 | Fair. |
| Do | 5 | 8.2 | Very good. |
| Na dioctyl succinate | 5 | 4.2 | Poor. |
| Do | 5 | 8.4 | Good. |
| Do | 10 | 3.9 | Very poor. |
| Do | 10 | 8.5 | Good. |
| Na oxyethylene nonyl phenol SO$_4$ | 5 | 2.85 | Very poor. |
| Do | 5 | 8.4 | Good. |

The above data show that the compatibility of the latex with pigments is best at a pH above 8. Sodium lauryl sulfate emulsifier forms an emulsion which is compatible with pigment at low pH and is markedly improved at pH above 8. Sodium dioctyl succinate and sodium oxyethylene nonyl phenol sulfate which form emulsions incompatible with pigments at low pH are also much improved at pH above 8. However, the compatibility of these emulsions with pigments is inferior to that of sodium lauryl sulfate. Sodium cetyl sulfate, sodium oleyl sulfate, ammonium lauryl sulfate, potassium lauryl sulfate, triethanolamine lauryl sulfate and diethanolamine lauryl sulfate also form emulsions which show excellent compatibility with pigment.

EAMPLE 6

The following data were obtained to determine whether sodium lauryl sulfate is effective as emulsifier for other polymer systems.

Butyl rubber cement obtained by the solvent replacement technique in which the polymer effluent from the reactor is in the form of a 16 wt. percent hexane solution was emulsified with 5 phr. sodium lauryl sulfate using a 60/40 hydrocarbon/water volume ratio. The pH of the raw latex was 6.7. This raw latex was stripped to a solids content of 12.7% at which time approximately 29% has coagulated. The pH of the stripped latex was 2.8.

When butyl rubber cement prepared from butyl rubber made by the slurry process (e.g. in accordance with the teachings of U.S. Patent No. 2,611,751 and similar disclosures) is substituted for the solvent-replacement cement only 61–68% of the polymer was recovered. In this experiment 34 grams (3.5 phr.) of sodium lauryl sulfate were added to 900 grams of deionized water. To this was added slowly with vigorous agitation 1400 grams of butyl rubber cement (19.5% N.V.M.) and stirring continued for 45 minutes. The raw latex was allowed to oil out overnight as a result of which 14 wt. percent of polymer was lost. This raw latex was stripped to remove solvent and concentrated to 45.7% N.V.M. in a four liter batch stripper. About 19.8% of the polymer coagulated during this stripping step. A total of 185 grams or about 61% of the original polymer solids was recovered in the final latex. Upon repeating this experiment but inserting a cooling coil in the dispersion flask and dispersing for one hour instead of 45 minutes, the recovery increased only to 68%.

For comparison, 62 grams (3.5 phr.) of sodium lauryl sulfate were dissolved in 1000 grams of water and 517 grams of the oxidized polymer of Example 1 dissolved in benzene (25.9% N.V.M.) were slowly added and the mixture agitated for one hour. The resulting raw latex was allowed to stand overnight with no substantial oiling out. 2000 grams of the raw latex were stripped in a four liter flask to a concentration of 48.9% N.V.M. Only about 6.2% of the polymer coagulated. A total of 91 wt. percent of the original polymer was recovered in the final latex. The data are summarized below:

| | Run | | |
|---|---|---|---|
| | 1 | 2 | 3 |
| Polymer | Butyl Rubber | Butyl Rubber | Oxidized Polymer |
| Emulsifier (3.5 phr.) | Sodium lauryl sulfate | | |
| Oiling Out, percent | 14 | 11.0 | 0 |
| Coagulum, percent | 19.8 | 17.0 | 6.2 |
| Recovery, percent | 61.0 | 68.0 | 91 |
| Finished Latex: | | | |
| N.V.M. | 45.7 | 53.3 | 48.9 |
| pH | 8.1 | 9.1 | 2.8 |
| Viscosity, cps | 50 | 270 | 90 |

These data clearly show that sodium lauryl sulfate when used alone forms excellent emulsions of oxidized diolefin polymers which are stable to stripping (91% polymer recovery) while it does not form heat stable emulsions of butyl rubber (61 to 68% polymer recovery).

In summary, therefore, it has been found that latices having excellent thermal and pigment stability and which form coatings which have increased water resistance and improved impact strength can be made by emulsifying hydrocarbon solutions of oxidized liquid diolefin polymers with 2–5 phr. of an alkali metal salt (including ammonium) of fatty alcohol sulfates, removing the solvent and adjusting the pH to above 8. When the high pH latex is blended with pigment, coatings can be formed with excellent water resistance and high impact strength. An especially preferred embodiment of this invention is where 2–5 phr. of a highly hydrophobic emulsifier is used at a hydrocarbon/water ratio of 70/30 in the preparation of the crude latex from the hydrocarbon solution of polymer. The hydrophobic nature of the emulsifier and the high hydrocarbon/water ratio contribute to the production of small particle size latices.

Besides clear and pigmented coatings, the latices of the present inveniton are suitable for use in the preparation of laminants for paper, wood, canvas and plywood, binder for cork, wood, fiber and leather buffings, industrial gloves, adhesives and the like.

The nature of the present invention having been thus fully set forth and specific examples of the same given, what is claimed as new and useful and desired to be secured by Letters Patent is:

1. The method for preparing a pigment stable latex from a liquid polymer obtained by the polymerization of a conjugated diolefin of 4 to 6 carbon atoms which comprises treating said liquid polymer with oxygen at a temperature between 20 and 250° C. in the presence of a hydrocarbon solvent, emulsifying a solution of said oxidized polymer in the same solvent in which it was treated with oxygen by agitating it with water in the presence of 2 to 5 parts by weight of emulsifier per 100 parts by weight of liquid polymer said emulsifier having the formula MRSO$_4$ where M is selected from the class consisting of sodium, potassium, ammonium, triethanolamine and diethanolamine and R is selected from the group consisting of lauryl, cetyl, oleyl, and ethoxylated derivatives thereof, removing the solvent and adjusting the pH to above 8.0.

2. The method of claim 1 in which the polymer is a copolymer of 75 to 100 parts by weight of butadiene and 25 to 0 parts by weight of styrene.

3. The method of claim 2 in which the emulsifier is sodium lauryl sulfate.

4. The method of claim 2 where the emulsifier is sodium cetyl sulfate and at least seventy parts by volume of polymer solution is agitated with 30 parts by volume of water.

5. The method of claim 2 where the emulsifier is sodium oleyl sulfate.

References Cited by the Examiner

UNITED STATES PATENTS 2,955,094  10/1960  Brodkey et al. _____ 260—29.7

FOREIGN PATENTS 832,147  4/1960  Great Britain.

OTHER REFERENCES

Schwartz et al.: "Surface Active Agents," 1949, pp. 44–56, Interscience Publishers, Inc., New York.

MURRAY TILLMAN, *Primary Examiner.*

LEON BERCOVITZ, *Examiner.*